April 6, 1926.
H. J. MURRAY ET AL
1,579,728
SYNCHRONIZER
Filed Nov. 24, 1922
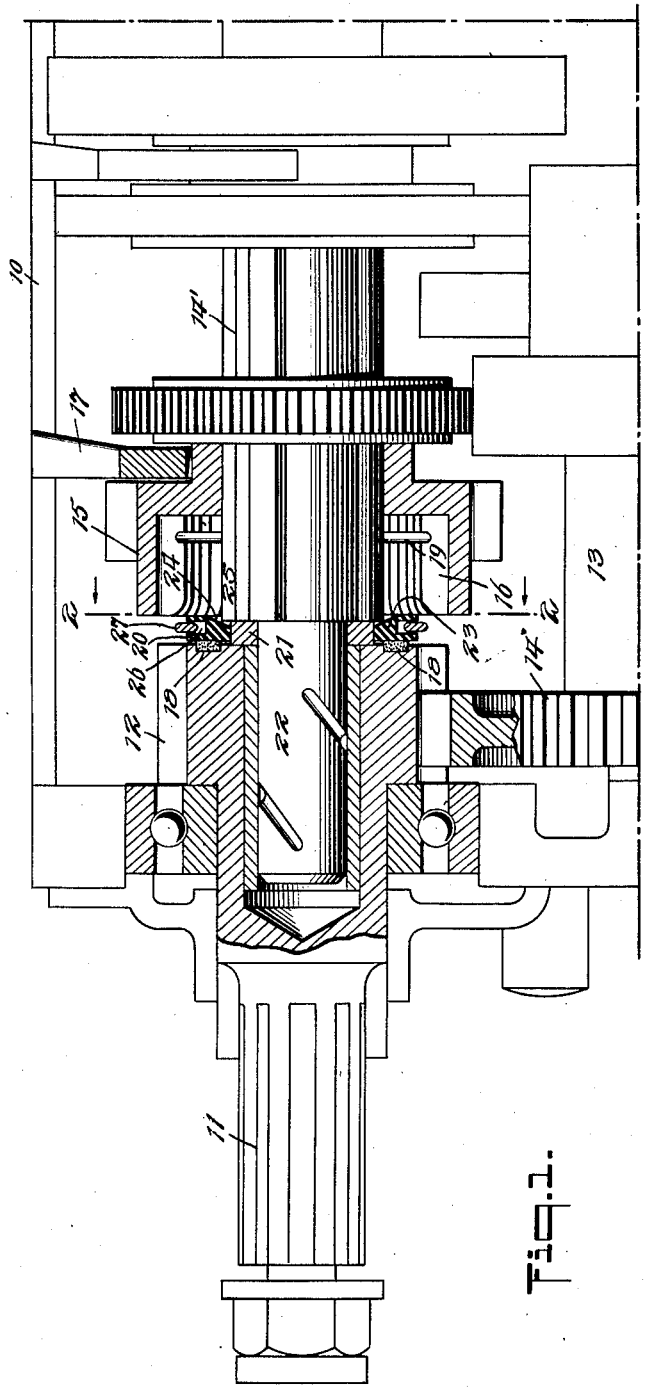
INVENTOR
Howard J. Murray
and Walter S. Rugg.
by
Warren S. Orton.
ATTORNEYS Patented Apr. 6, 1926.

1,579,728

UNITED STATES PATENT OFFICE.

HOWARD J. MURRAY, OF BROOKLYN, NEW YORK, AND WALTER S. RUGG, OF PITTSBURGH, PENNSYLVANIA.

SYNCHRONIZER.

Application filed November 24, 1922. Serial No. 603,059.

*To all whom it may concern:*

Be it known that we, HOWARD J. MURRAY, a citizen of the United States, and a resident of Brooklyn, county of Kings, and State of New York, and WALTER S. RUGG, a citizen of the United States, and a resident of Pittsburgh, county of Allegheny, and State of Pennsylvania, have invented certain new and useful Improvements in Synchronizers, of which the following is a specification.

The invention relates to a synchronizing device for causing a pair of clutch elements, or other power transmitting members, to approach the same speed before they are moved into, or just prior to being moved into, meshing or inter-driving relation.

The present application is to be regarded as a companion case with Patent No. 1,511,232, dated October 14, 1924, clutch ring synchronizing device.

The invention herein disclosed specifically relates to a synchronizing device for use in those situations where the clutches or gears are moved relative to each other along the same axis of rotation and as an illustration of one situation where a synchronizer of this type is particularly effective the invention will be described in connection with the coupling of the power shaft with the propeller shaft in the transmission casing of an automotive vehicle structure in effecting the usual direct driving relation.

The primary object of the invention is to provide a simplified form of synchronizing device for use in power transmission organizations where relatively shiftable power elements such as clutch or gear sets are designed for relative axial movement into intermeshing relation.

In the present disclosure a form of structure is featured which will include a clutch of the friction type and in which one of the power elements constitutes one of the clutch elements and in which the coacting clutch element is positioned between the power elements and movable into clutching relation as an incident to the moving of the elements into their meshed or other inter-driving relation.

The invention specifically contemplates the use of a resilient clutching element carried by the shiftable friction clutching element, disposed in the path of movement of the mechanical clutch elements when shifted into their driving relation and arranged so as to provide a temporary friction drive which will give under the force of the continued movement of the elements into their clutching position and be forced into an inoperation position thus permitting the elements to effect their power transmission.

Another object of the invention is to provide, in connection with the friction clutching features, a simplifying of the structural parts over the disclosure in the above identified patent while retaining the advantages inherent in this previous construction.

Still another object of the invention is to provide a single spring controlled element which will function as a slip clutch between the gears and which will also function to lock the gears against accidental displacement from their intermeshed position.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the accompanying drawings:—

Figure 1 is a view largely in diagrammatic outline of a conventional form of power transmission equipped with a synchronizing device constituting a preferred embodiment of the invention;

Figure 2 is a transverse sectional view through the synchronizer taken on the line 2—2 of Figure 1 and looking in the direction indicated by the arrows; and Figure 3 is a perspective view of the synchronizer ring removed from its associated parts in Figure 1.

In the following description and in the claims, parts will be identified by specific names for convenience of expression but they are intended to be as generic in their application to similar parts as the art will permit.

In the drawings there is shown a transmission casing 10 of conventional form and more particularly described in the above identified patent. There is shown the usual power shaft 11 for driving the main gear 12 which drives the countershaft 13 through the gear 14. The inner end of the gear 12 also constitutes an axially fixed element of a mechanical clutch and will be referred to hereinafter as the driving or male clutch element or jaw. The propeller shaft 14' which aligns with the power shaft 11 is provided with a gear unit 15 keyed thereto. The unit 15 includes a coacting clutch element 16, referred to hereinafter as the driven or female clutch element or jaw, and into which telescopes the male element 12 as the unit 15 is shifted from right to left of the position shown in Figure 1 by the controlled mechanism 17, all as is well known in devices of the character herein disclosed. The gear unit 15 resembles the similar structure now known in a well known form of transmission mechanism except that the inner end of the driving gear 12 is provided with a friction face herein indicated by a removable inset fabric ring 18 and the teeth or projections formed on the female element 16 are provided with a peripheral recess 19 constituting a part of a mechanical clutch locking construction hereinafter more fully described.

A synchronizer 20 particularly forming the subject-matter of this disclosure is mounted on a bearing ring 21 positioned on the reduced end 22 of the driven shaft 14' and between the unreduced end of the shaft 14' and the adjacent end of the gear 12. The synchronizer includes a clutch ring 23 rotatably mounted on the ring 21 and turning with the shaft 14'. The connection with the shaft 14' is conveniently attained by providing the side face of the clutching ring with circumferentially spaced recesses 24 in which are positioned the adjacent end of the shaft with its key-way forming projections 25. This clutch ring has a slight freedom of movement axially of the shaft to and from a side face clutching engagement with the ring 18.

This clutch ring is provided with a peripheral groove 26 in which is mounted a split resilient ring 27. This ring is so proportioned that normally, when in expanded position, it projects radially out of the groove and beyond the peripheral outline of the clutch ring. When so positioned the split ring is in the path of movement of the teeth forming the female element 16, the free ends of which teeth are bevelled as is usual in such constructions.

In operation it will be understood that as the gear unit 15 is shifted to the left from the position shown in Figure 1, it will bring the bevelled ends of the projections or teeth of the female element into bearing engagement with the split ring which at this time will function as a resilient stop and transmit the movement of the shiftable unit directly onto the shiftable clutch ring and in this way cause the clutch ring to be forced into clutching engagement with the end of the main gear. There is thus provided a frictional drive between the gear 12 and the unit 15 and in this way there is effected a direct frictional drive between the power shafts 11 and 14'. As the unit 15 continues to move to the left it will act on the split spring ring and contract the same out of the path of movement of the shifting gear and in this way permit the female element to telescope the synchronizing device and to move into clutching engagement with the male element as is usual in such constructions.

The peripheral groove 19 is so spaced from the end of the female element that the split ring will be opposite the locking groove when the elements are in their fully clutched position. The split ring will then spring into the groove and in this way the elements will be locked against accidental displacement.

In shifting the fork 17 to the right in order to effect an unclutching of the elements there will be exerted sufficient force to overcome the locking effect of the split ring and the ring will be contracted so as to slip out of the peripheral groove. This spring contraction will be assisted by the rounding contacting surfaces between the ring and the locking groove. At the end of the final shifting movement the parts will be restored into the position shown in Figure 1 and the synchronizing parts will be automatically restored into position so as to become operative when the gears are again shifted to effect an intermeshing between the same.

By means of the type of synchronizer herein disclosed it is possible to attain an effective synchronizing of the associated clutching elements without materially changing conventional, similar structural parts, for obviously the locking groove may be omitted and the friction creating face at the end of the main gear may be confined to the clutch ring element. This clutch ring element constitutes, in effect, the entire synchronizer which can be readily mounted on the reduced portion of the driven shaft. The synchronizer therefore is substantially nothing more than a small clutch ring carrying a split ring at its periphery and can be manufactured at relatively small cost.

While we have shown and described, and have pointed out in the annexed claims, certain novel features of our invention, it will be understood that various omissions, substitutions and changes in the form and details of the device illustrated and in its operation may be made by those skilled in the art without departing from the spirit of the invention.

We claim as our invention

1. In a transmission, the combination of a driving shaft provided with a main gear, one end of which constitutes a clutch element, a driven shaft having a reduced end constituting a hub extending axially into the main gear, a gear unit slidable on the driven shaft and provided with a coacting clutch element adapted to be moved in one direction into clutching engagement with the clutch element on the main gear a clutch ring carried on the hub and having a slight freedom of axial movement into clutching engagement with the first named clutch element formed by the adjacent end of the main gear, said clutch ring provided with a peripheral groove, a split ring positioned in said groove and normally projecting therefrom; said ring disposed in the path of movement of the gear unit as it is moved towards the main gear whereby the continued movement of the gear unit towards its clutching engagement with the main gear will shift the clutch ring into frictional engagement with the main gear and thus cause the shafts to approach the same speed prior to their interengaging through the gear clutch elements.

2. In a transmission, the combination of a driving shaft provided with a main gear, provided with a clutch jaw, a driven shaft having a reduced end constituting a hub extending axially into the main gear, a gear unit slidable on the driven shaft and including a coacting clutch jaw adapted to be moved in one direction into engagement with the main gear jaw, a clutch ring carried on the hub movable into clutching engagement with the adjacent end of the main gear, said clutch ring provided with a peripheral groove, a split ring positioned in said groove and normally projecting therefrom, said ring disposed in the path of movement of the gear unit as it is moved towards the main gear whereby the continued movement of the gear unit towards its clutching engagement with the main gear will shift the clutch ring into bearing engagement with the main gear and thus cause the shafts to approach the same speed prior to their interengaging through the jaws on the gear unit and main gear.

3. In a device of the class described the combination of a driving shaft provided with a main gear fixed against axial movement and providing a friction clutch face on one end thereof, a driven shaft in axial alignment with the driving shaft, a coacting unit keyed to the driven shaft and slidable axially thereon to and from a clutching engagement with the main gear, a synchronizer positioned between the main gear and unit for causing the shafts to approach the same speed prior to the interengaging of the main gear unit, said synchronizer including a clutch element for frictionally engaging said clutch face, and a resilient member disposed in the path of movement of the unit and adapted to be engaged thereby to clutch the unit with the clutch element and permit the unit in its advance to pass the synchronizer.

4. In a device of the class described, the combination of a pair of coacting clutch jaws having a common axis of rotation and movable axially relative to each other to and from an interdriving position, means between the jaws for causing them to approach the same speed before they assume said interdriving position, said means including a clutch element having an axial movement and coacting with one of the jaws to form a friction clutch therewith and a retractile stop between the clutch element and the other jaw for transmitting axial movement from said other jaw to the clutch element until resisted by the engagement of the clutch element with its cooperative clutching jaw.

5. In a device of the class described, the combination of a mechanical clutch including a pair of jaws having a common axis of rotation and movable axially relatively to each other to and from an interdriving position, means between the jaws for causing them to approach the same speed before they assume said interdriving position, said means including a clutch element having an axial movement and coacting with one of the jaws to form a clutch and a retractile stop between the clutch element and the other jaw for transmitting axial movement from said other jaw to the clutch element until resisted by the engagement of the clutch element with its coactive clutching jaw and means controlled by the continued movement of said other jaw for permitting said retractile stop to move into an inoperative position with reference to its transmitting function.

6. In a device of the class described, the combination of a mechanical clutch including a pair of jaws having a common axis of rotation and movable axially relative to each other to and from an interengaging position, means between the jaws for causing them to approach the same speed before they assume said interengaging position, said means including a clutch element having an axial movement and coacting with one of the jaws to form a clutch and a spring stop carried by the clutch element, normally disposed in the path of movement of the other jaw and adapted to be engaged by said other jaw to move the clutch element into operative position.

7. In a device of the class described, the combination of a clutch including a pair of jaws having a common axis of rotation and movable axially relative to each other to and from an interengaging position, means between the jaws for causing them to approach the same speed before they assume said interengaging position, said means including a clutch element having an axial movement and coacting with one of the jaws to form a clutch and a spring stop carried by the clutch element, normally disposed in the path of movement of the other jaw and adapted to be engaged by said other jaw to move the clutch element into operative position, and means for releasing said engagement prior to the interengaging of the jaws in their clutching relation.

8. In a device of the class described, the combination of two power members movable axially into driving relation, a synchronizer when actively disposed between the members tending to cause them to approach the same speed, said synchonizer including a flat-face friction clutch element rotatable with one of the members extending in a plane perpendicular to the axis of rotation of said member and movable axially into face clutching engagement with the other member, and a split ring constituting a slip clutch connection between the clutch element and said other member.

9. In a device of the class described, the combination of two power members movable axially into driving relation, a synchronizer when actively disposed between the members tending to cause them to approach the same speed, said synchonizer including a retractile spring stop normally disposed in the path of relative axial movement of the members and adapted to provide a stop-clutch connection and said stop movable out of its clutching position in said path and into a position to lock the members on a continued advance of the members into their driving relation.

10. In combination with two members having clutch jaws to be interengaged, of a synchronizer for causing the members to approach the same speed, said synchronizer including a clutch ring provided with a peripheral groove and constituting the movable element of a friction clutch, a split ring carried by the groove, normally projecting beyond the outlines of the clutch ring and adapted to be contracted within the outlines of the clutch ring thereby to permit the clutch ring to be telescoped by one of said gears.

11. In a device of the class described, the combination of a shaft, a clutch ring mounted on the shaft and having a slight freedom of movement into a clutching position, a spring stop ring carried thereby, normally projecting beyond the outlines thereof and a member shiftable on the shaft, adapted to engage said stop ring to cause the clutch ring to move into operative position and said shiftable member adapted to overcome the resistance of said spring ring and telescope the clutch ring.

12. In a device of the class described, the combination of a shaft, a clutch ring mounted on the shaft and having a slight freedom of movement into a clutching position, a spring stop ring carried thereby, normally projecting beyond the outlines thereof and a member shiftable on the shaft, adapted to engage said stop ring to cause the clutch ring to move into operative position, said shiftable member adapted to overcome the resistance of said spring ring and telescope the clutch ring, and said member provided with a recess for receiving the projecting part of the spring ring when the shiftable member is in its telescoped position.

13. In a device of the class described, the combination of a mechanical clutch including a pair of jaws mounted for relative axial movement to and from an interdriving position, a synchronizer for causing the jaws to approach the same speed prior to interengaging and a split ring constituting a spring catch forming part of the synchronizer for securing the jaws in their interclutching position.

14. In a device of the class described, the combination of a mechanical clutch including a female clutch element provided with a recess and a coacting male element having relative axial movement and adapted to clutch with the female element, a synchronizer for causing the elements to approach the same speed prior to engaging in their clutching relation, said synchronizer including a spring adapted to connect the elements frictionally prior to their mechanical engagement and adapted to engage in said recess to lock the elements in their clutching relation against accidental axial movement.

15. In a device of the class described, the combination of a pair of clutch elements mounted for relative axial movement to and from a clutching position, a synchronizer for causing the elements to approach the same speed prior to interengaging and a split ring constituting a spring catch for securing the elements in their interengaging relation.

16. In a device of the class described, the combination of a female clutch element provided with a recess, a coacting male element having relative axial movement and adapted to clutch with the female element, a spring adapted to connect the elements frictionally prior to their mechanical interengaging and adapted to engage in said recess to lock the elements in their interengaging relation.

This specification signed this 6th day of November, 1922.

HOWARD J. MURRAY.

This specification signed this 6th day of November, 1922.

WALTER S. RUGG.